(12) United States Patent
Su et al.

(10) Patent No.: US 10,705,058 B2
(45) Date of Patent: Jul. 7, 2020

(54) SENSING OPTICAL FIBER ACOUSTIC EMISSION INTEGRATED SENSING SYSTEM AND METHOD FOR MONITORING SAFETY OF STRUCTURE

(71) Applicant: HOHAI UNIVERSITY, Nanjing (CN)

(72) Inventors: Huaizhi Su, Nanjing (CN); Meng Yang, Nanjing (CN); Chongshi Gu, Nanjing (CN)

(73) Assignee: HOHAI UNIVERSITY, Nanjing (CN)

( * ) Notice: Subject to any disclaimer, the term of this patent is extended or adjusted under 35 U.S.C. 154(b) by 48 days.

(21) Appl. No.: 16/312,302

(22) PCT Filed: Jan. 16, 2017

(86) PCT No.: PCT/CN2017/071294
§ 371 (c)(1),
(2) Date: Dec. 21, 2018

(87) PCT Pub. No.: WO2018/000809
PCT Pub. Date: Jan. 4, 2018

(65) Prior Publication Data
US 2019/0234910 A1    Aug. 1, 2019

(30) Foreign Application Priority Data

Jun. 27, 2016  (CN) .......................... 2016 1 0483066

(51) Int. Cl.
*G01N 29/14*   (2006.01)
*G01H 9/00*   (2006.01)
(Continued)

(52) U.S. Cl.
CPC ......... *G01N 29/4463* (2013.01); *G01H 9/004* (2013.01); *G01N 29/14* (2013.01); *G01N 29/2418* (2013.01); *G01N 2291/0258* (2013.01)

(58) Field of Classification Search
CPC .... G01H 9/004; G01N 29/14; G01N 29/2418; G01N 29/4463; G01N 2291/0258
(Continued)

(56) References Cited

U.S. PATENT DOCUMENTS 5,104,391 A  *  4/1992  Ingle .................... A61B 18/20
                                              250/227.15
5,402,231 A  *  3/1995  Udd ................... G01M 5/0016
                                              356/460

(Continued)

FOREIGN PATENT DOCUMENTS

CN             104006900       *  8/2014

*Primary Examiner* — Jacques M Saint Surin
(74) *Attorney, Agent, or Firm* — CBM Patent Consulting, LLC

(57) ABSTRACT

A sensing optical fiber acoustic emission integrated sensing system and method for monitoring the safety of a structure which comprises a sensing optical fiber temperature interference removal device and a sensing optical fiber acoustic emission demodulation device. A sensing optical fiber (206) successively passes through the sensing optical fiber temperature interference removal device and the sensing optical fiber acoustic emission demodulation device. A distributed sensing optical fiber acoustic emission regulation and control device for sensing the degradation of structure performance is integrated with a sensing optical fiber acoustic emission sensing system with multiple complex devices, multiple functional modules and multiple interconnection components.

9 Claims, 4 Drawing Sheets

(51) Int. Cl.
*G01N 29/24* (2006.01)
*G01N 29/44* (2006.01)

(58) Field of Classification Search
USPC .......................................................... 73/587
See application file for complete search history.

(56) References Cited

U.S. PATENT DOCUMENTS

| | | | |
|---|---|---|---|
| 6,710,328 B1* | 3/2004 | Mastro | G01L 1/24 250/227.11 |
| 9,726,645 B2* | 8/2017 | Soejima | G01N 29/2418 |
| 2013/0098164 A1* | 4/2013 | Okoli | G02B 6/02033 73/800 |
| 2013/0188176 A1* | 7/2013 | Lovely | G01D 5/353 356/73.1 |
| 2013/0188177 A1* | 7/2013 | Lovely | G01N 21/21 356/73.1 |
| 2015/0233236 A1* | 8/2015 | Johnston | E21B 47/123 73/152.16 |

* cited by examiner

SENSING OPTICAL FIBER ACOUSTIC EMISSION INTEGRATED SENSING SYSTEM AND METHOD FOR MONITORING SAFETY OF STRUCTURE

TECHNICAL FIELD

The present invention relates to a distributed sensing optical fiber acoustic emission regulation and control device and method for sensing the degradation of structure performance, and belongs to the field of structural safety monitoring and detection of water engineering.

BACKGROUND ART

An optical fiber sensing technology uses light waves as sensing signals and optical fibers as transmission carriers to sense and detect external signals. It superior to conventional electrical sensors in sensing modes, sensing principles, signal detection and processing, etc. Compared with conventional sensing elements, the optical fiber sensing technology has the advantages of anti-electromagnetic interference, chemical corrosion resistance, radiation resistance, no electrification, small size, light weight, easy bending, etc. In 1977, the U.S. Naval Research Laboratory (NRL) began to implement the Foss program (optical fiber sensor system) hosted by Dr. Charles M. Davis. Since then, optical fiber sensors have been introduced, and subsequent technologies such as OTDR, BOTDA and FBG have been continuously proposed. The optical fiber sensing technology is increasingly being valued and utilized, but due to its low spatial resolution, high light loss within a large transmission distance and other factors, the development of the optical fiber sensing technology toward miniaturization, long range, distribution, and high precision is seriously hindered.

When external factors such as stress, temperature, corrosion and load interfere with a concrete structure, the inside of a material may be broken or deformed. In this case, the structure will release elastic energy, i.e. acoustic emission. The acoustic emission technology is essentially sensing and collecting these acoustic emission signals by using some acoustic emission sensors, storing and discriminating these acoustic emission signals to infer possible damages and destructions in the structure, and finally determining the service condition of the concrete structure. The acoustic emission technology has the advantages of dynamism, sensitivity, integrity, etc., but there are still many defects, such as short signal transmission distance, less monitoring content, and poor anti-electromagnetic interference capability, which seriously hinder its development.

The conventional piezoelectric ceramic acoustic emission detection method has mature technology and simple operation, but still has many drawbacks. For example, the system is relatively large, cables are too many, and the anti-electromagnetic interference capability is poor. Therefore, a novel optical fiber Bragg grating type acoustic emission detection system is produced, which has high sensitivity and strong anti-electromagnetic interference capability, but this method also has serious problems that it still belongs to the current conventional point-based monitoring, which is far from meeting the current requirements of large structure, wide range of monitoring, long-distance transmission and the like. Therefore, it is necessary to develop a novel distributed sensing optical fiber type acoustic emission monitoring and detection system.

SUMMARY OF THE INVENTION

Object of the Invention: In order to overcome the deficiencies in the prior art, the present invention provides a distributed sensing optical fiber acoustic emission regulation and control device and method for sensing the degradation of structure performance. A sensing optical fiber temperature interference removal device, a sensing optical fiber acoustic emission sensing device and a sensing optical fiber acoustic emission demodulation device are fused. A sensing optical fiber acoustic emission sensing system is integrated with multiple complex devices, multiple functional modules and multiple interconnection components. A novel monitoring and detection fused technology for multi-hierarchy and high-accuracy identification is realized, and high-accuracy detection and monitoring for tiny structural damage in a structure can be realized.

Technical Solution: In order to solve the foregoing technical problem, a sensing optical fiber acoustic emission integrated sensing system for monitoring the safety of a structure is characterized by including a sensing optical fiber temperature interference removal device and a sensing optical fiber acoustic emission demodulation device. A sensing optical fiber successively passes through the sensing optical fiber temperature interference removal device and the sensing optical fiber acoustic emission demodulation device.

The sensing optical fiber temperature interference removal device includes a vacuum chamber module, a composite material flat slot module and a port fiber fixation module, the vacuum chamber module is connected to the composite material flat slot module, the port fiber fixation module is connected to the vacuum chamber module through a four-corner plug body, the sensing optical fiber sequentially passes through the composite material flat slot module, the vacuum chamber module and the port fiber fixation module, and the vacuum chamber module, the composite material flat slot module and the port fiber fixation module are all fixed in a mounting tube, and the mounting tube is located on a temperature removal bottom platform; the composite material flat slot module includes a cylinder made of a special composite material, a through hole through which the sensing optical fiber passes is provided in the center of the cylinder, a pressing cover is disposed at the top of the cylinder, and a concavo-concave glue injection groove is provided in the center of the pressing cover; the vacuum chamber module includes a vacuum chamber and an outer elastic fastening ring, one end of the vacuum chamber is connected to a cover plate which is fixed in the mounting tube by glue while the other end is connected to the outer elastic fastening ring, a circular hole is provided in the center of the outer elastic fastening ring, an outer hard fiber protection layer is disposed in the circular hole, a conical hole is provided at the bottom end of the outer elastic fastening ring, the four-corner plug body is mounted in the conical hole, a cylindrical boss extends from the four-corner plug body, the cylindrical boss is located in the outer hard fiber protection layer, the sensing optical fiber passes through the interior of the cylindrical boss, the vacuum chamber is connected to a vacuuming device outside the mounting tube, and the sensing optical fiber sequentially passes through the cover plate, the vacuum chamber and the four-corner plug body; the port fiber fixation module includes a left arc-shaped pressing body and a right arc-shaped pressing body, one ends of the left arc-shaped pressing body and the right arc-shaped pressing body are hinged to the bottom end of the outer elastic fastening ring respectively while bosses extend from the other ends of the left arc-shaped pressing body and the right arc-shaped pressing body respectively, the boss is provided with a connecting device, arc-shaped surfaces of the left arc-shaped pressing body and the right arc-shaped pressing body are disposed face to face, and the left arc-shaped pressing body and the right arc-shaped pressing body form an arc-shaped pressing cavity through which the sensing optical fiber passes.

The sensing optical fiber acoustic emission demodulation device includes a plurality of sensing optical fiber acoustic emission sensing devices and an acoustic emission source, the sensing optical fiber acoustic emission arrangement device includes an inner support body, a mesh module, a fiber carrying module and a bend connecting module, the inner support body, the mesh module and the fiber carrying module form a cylindrical shape, the inner support body has a four-sided concave section, the inner support body has four concave surfaces, the four concave surfaces of the inner support body are separately provided with a mesh module having a plurality of meshes, the fiber carrying module is disposed between two adjacent mesh modules, and the sensing optical fiber is contained in the fiber carrying module; and the acoustic emission source is connected to one end of the sensing optical fiber, the other end of the sensing optical fiber is connected to a receiver, and the receiver is sequentially connected to an optical detector, a second amplifier, a signal processor, a memory, and a concrete structure monitoring and evaluation information system.

Preferably, the vacuuming device includes a vacuum pump and an air valve, the vacuum chamber is connected to the air valve through a pipeline, the vacuum pump is mounted on the air valve, and a vacuum sensor is mounted on the pipeline.

Preferably, the connecting device includes a frame transverse connecting shaft, the two bosses are separately provided with a through hole, and the frame transverse connecting shaft passes through the two through holes and is locked by an elastic control cap.

Preferably, a laser light source is further included. The laser light source is connected to an optical splitter through a mode-locked laser, a polarization beam splitter, a nonlinear amplifier, a spectrometer, a Michelson interferometer, a femtosecond pulse, an edge filter and a first amplifier sequentially, and the optical splitter is connected to the sensing optical fiber.

Preferably, the mesh module includes a carrier, the carrier is provided with meshes in the axis direction of the sensing optical fiber, each carrier is provided with one of a triangular co-cavity mesh, a circular co-cavity mesh, a four-sided co-cavity mesh and a pentagonal co-cavity mesh, the meshes on all carriers have different shapes, and the triangular co-cavity mesh, the circular co-cavity mesh, the four-sided co-cavity mesh and the pentagonal co-cavity mesh are arranged in a counterclockwise order.

Preferably, the fiber carrying module includes an obstructing block, a closing plug, a double-optical fiber channel and a semi-circular fiber bearing platform, the semi-circular fiber bearing platform is connected to the carrier, the double-optical fiber channel is disposed in the semi-circular fiber bearing platform, two sensing optical fibers are provided in the double-optical fiber channel, both sides of the top of the semi-circular fiber bearing platform are separately hinged to a closing plug, and the two closing plugs are locked by the obstructing block.

Preferably, a fiber separating wall for separating two sensing optical fibers is disposed in the semi-circular fiber bearing platform, and the fiber separating wall is a vacuum insulation panel.

Preferably, a bend connecting module is further included. The bend connecting module includes a first base and a second base, the first base is connected to a folding shaft epitaxial column through a first collar, the second base is connected to the folding shaft epitaxial column through a second collar, the first collar and the second collar are separately provided with a locking device, the upper end of the first base is provided with a first fiber carrying bent hole, the upper end of the second base is provided with a second fiber carrying bent hole, the folding shaft epitaxial column is provided with an inner through hole, the inner through hole is internally provided with a bending folding shaft, and the upper end surface of the bending folding shaft is provided with a fixing plug.

An operation method of a distributed sensing optical fiber acoustic emission regulation and control device for sensing the degradation of structure performance includes the following steps:

first, connecting two bosses in series to a frame transverse connecting shaft through the frame transverse connecting shaft, rotating an elastic control cap on the frame transverse connecting shaft, and controlling the elastic control cap to rotate inward, so that the bosses move toward each other, and a sensing optical fiber is fixed into an arc-shaped pressing cavity by the bosses to form a vibrating wire mode;

second, configuring an outer hard fiber protection layer and an outer elastic fastening ring from inside to outside, fixing a cover plate in a mounting tube through glue to form a closed cavity, and fixing a sensing optical fiber on the cover plate by glue injection, where in this case, the vacuum chamber segment is in a state where there is no external temperature interference, an obtained stress-strain value is a value obtained after the temperature influence is removed, and it is recorded as a first temperature interference-free sensing optical fiber monitoring strain value; in this case, the vacuum chamber segment is in a state where there is no external temperature interference, and an obtained stress-strain value is a value obtained after the temperature influence is removed; an average value of the stress-strain values generated by an external load and monitored by the sensing optical fiber of the vacuum chamber segment and a cylinder serves as a final monitoring result;

third, removing an obstructing block, opening closing plugs on both sides around a bending folding shaft, arranging a double-optical fiber channel at the bottom end of a semi-circular fiber bearing platform along a fiber separating wall, arranging eight sensing optical fibers in four double-optical fiber channels in pairs, closing the closing plugs on both sides around the bending folding shaft, pressing a butt joint between the closing plugs, allowing the obstructing block to pass through the upper end of the fiber separating wall, fixing a closed part of the closing plugs on both sides, fixing obstructing blocks on other fiber separating walls in the same way, and finally completing the arrangement of a mesh module and a four-way fiber carrying module;

fourth, rotating the bending folding shaft according to the needs of engineering to drive a first base and a second base to rotate so as to form a certain included angle between a first fiber carrying bent hole and a second fiber carrying bent hole, inserting a fixing plug into the bending folding shaft, and fixing the bending folding shaft, so as to fix an angle between the first fiber carrying bent hole and the second fiber carrying bent hole; and fifth, when a structure generates an acoustic emission source under an external load, causing influence on femtosecond pulse light information of the sensing optical fiber in the sensing optical fiber acoustic emission sensing device by an acoustic emission wave in the acoustic emission source, wherein these pieces of information may be amplified and delayed in the physical size, the acoustic emission information that is secondarily amplified and delayed may be transmitted to the sensing optical fiber, the changed femtosecond pulsed light information is received and detected by a receiver and an optical detector, and then the changed femtosecond pulse light information is subjected to denoising processing and data storage through a signal processor and a memory to be further gathered into a structure monitoring and evaluation information system; and a time-history curve of the femtosecond pulse light information in the structure monitoring and evaluation information system is drawn to reflect the change of the acoustic emission wave generated by the acoustic emission source, so as to realize dynamic monitoring of a structure.

Advantageous Effect: A distributed sensing optical fiber acoustic emission regulation and control device for sensing the degradation of structure performance breaks through the traditional simple superimposition of simple technologies in the mechanism and practical engineering application level, and is integrated with a sensing optical fiber acoustic emission sensing system with multiple complex devices, multiple functional modules and multiple interconnection components. A sensing optical fiber acoustic emission integrated sensing system and method that fuses a femtosecond pulse technology, an acoustic emission technology and multiple stages of time delays and multiple acoustic wave vibration frequencies of multiple acoustic emission wave co-cavities at multiple stages of physical scales is proposed for the first time, so that a novel monitoring and detection fused technology for multi-hierarchy and high-accuracy identification is realized, whole distributed monitoring, high spatial resolution spatial positioning and high-accuracy quantitative identification can be completed, it has the advantages of strong flexibility, simple operation, convenient use and the like, processized and automated application can be realized, and it has great advantages in reducing the cost for monitoring, improving the accuracy of monitoring and enhancing the practical ability of engineering.

DETAILED DESCRIPTION OF THE INVENTION

Figure 1:
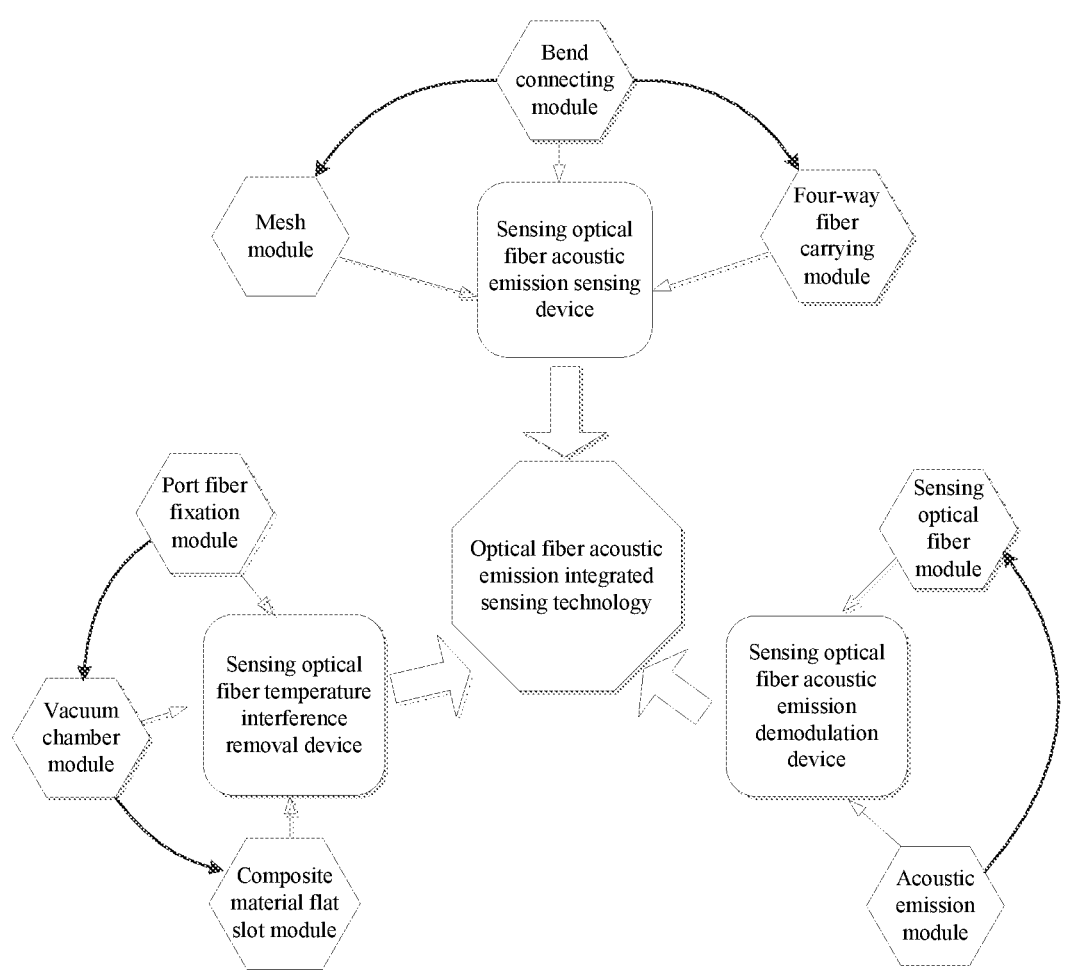
FIG. 1 is a structure diagram of the present invention.
Figure 2:
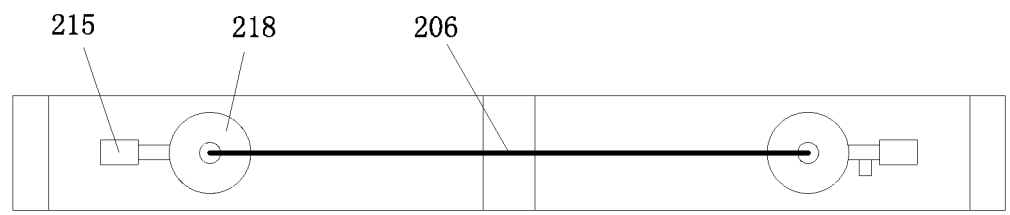
FIG. 2 is a schematic structure diagram of a sensing optical fiber temperature interference removal device in FIG. 1.
Figure 3:
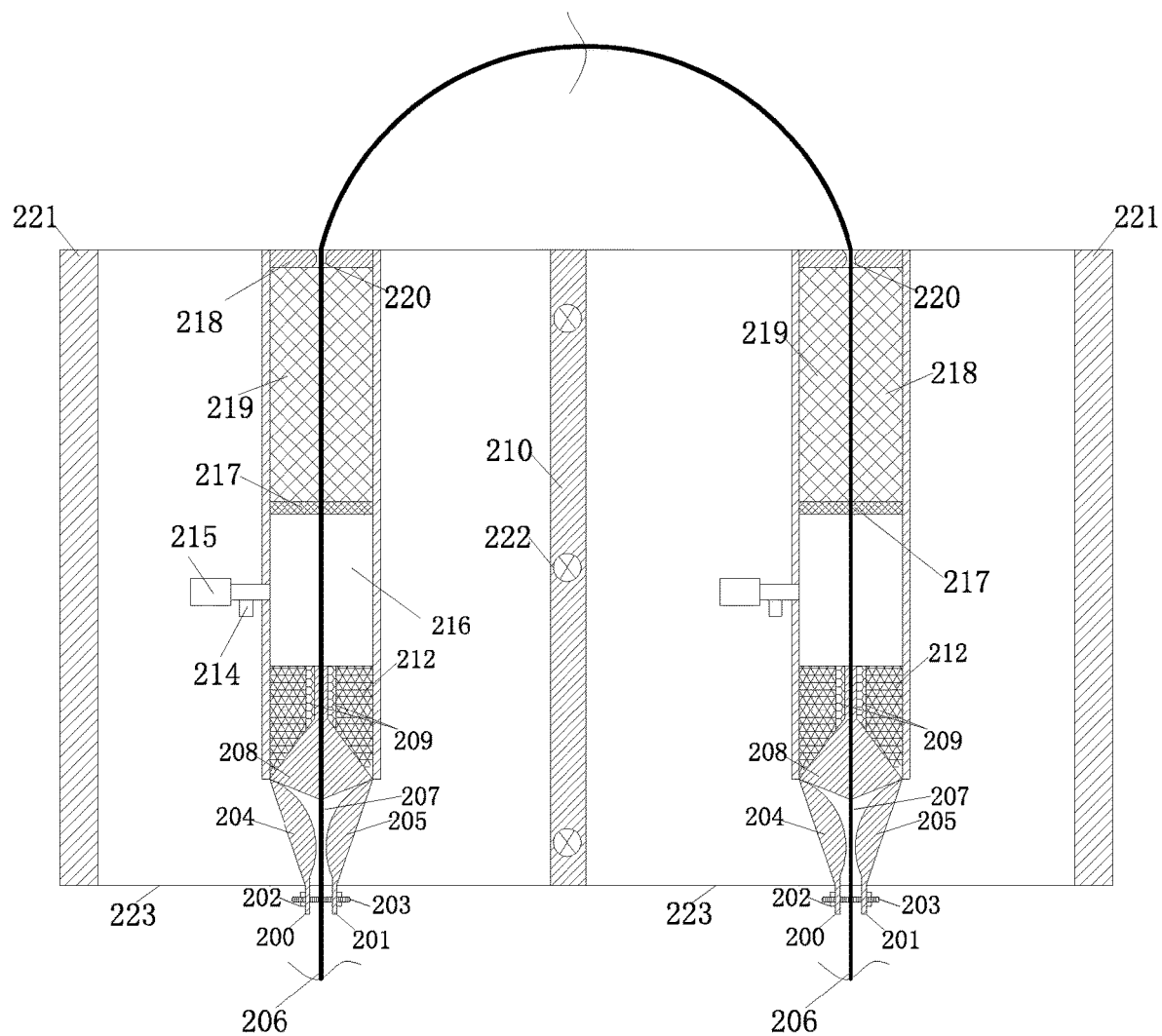
FIG. 3 is a front view of FIG. 2.
Figure 4:
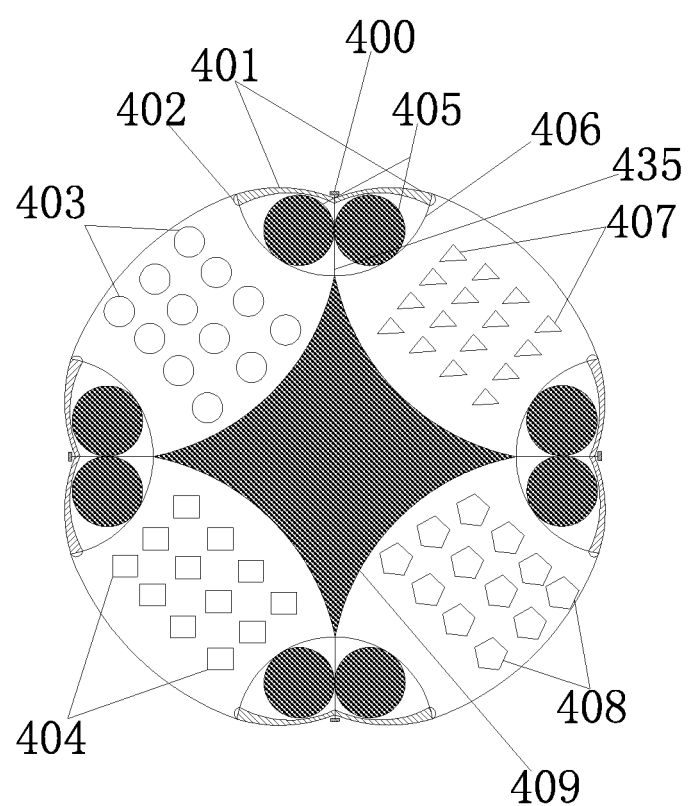
FIG. 4 is a schematic structure diagram of a sensing optical fiber acoustic emission sensing device in FIG. 1.
Figure 5:
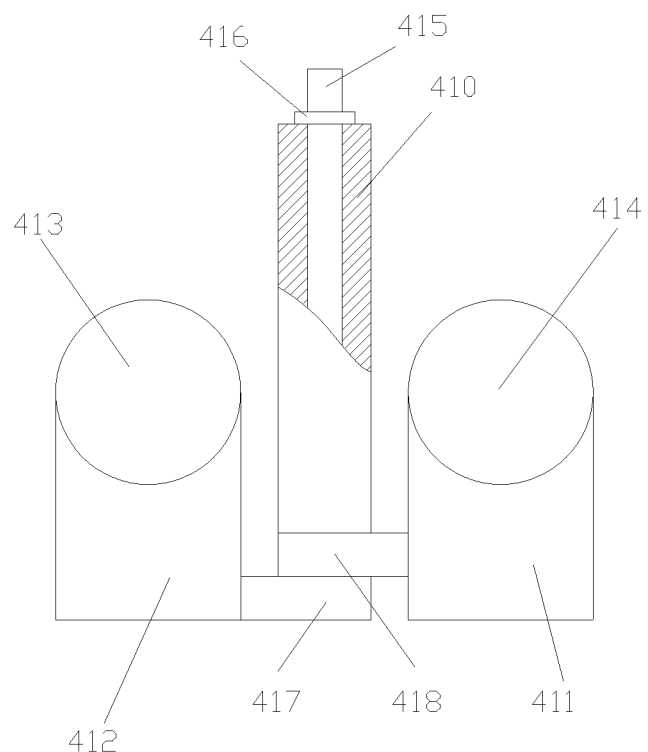
FIG. 5 is a schematic structure diagram of a bend connecting module.
Figure 6:
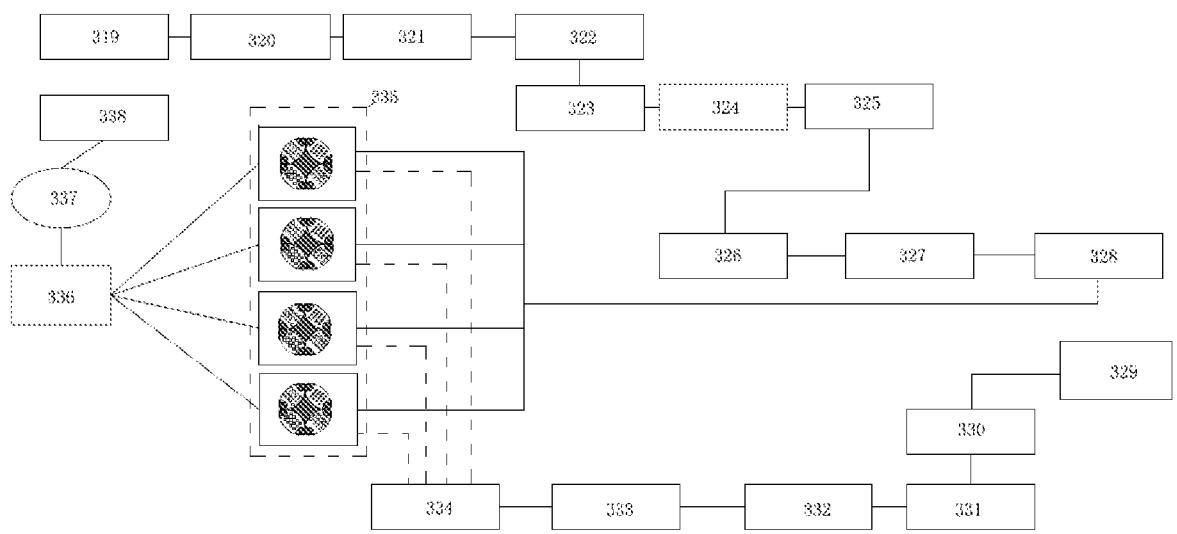
FIG. 6 is a schematic structure diagram of a sensing optical fiber acoustic emission demodulation device in FIG. 1.

As shown in FIG. 1 to FIG. 6, a sensing optical fiber acoustic emission integrated sensing system for monitoring the safety of a structure includes a sensing optical fiber temperature interference removal device and a sensing optical fiber acoustic emission demodulation device. A sensing optical fiber successively passes through the sensing optical fiber temperature interference removal device and the sensing optical fiber acoustic emission demodulation device.

The sensing optical fiber temperature interference removal device includes a vacuum chamber module, a composite material flat slot module and a port fiber fixation module. The vacuum chamber module is connected to the composite material flat slot module through a cover plate 217 having a side length of 2 cm. The port fiber fixation module is connected to the vacuum chamber module through a four-corner plug body having a vertex interval of 2 cm. The composite material flat slot module is connected to the port fiber fixation module through a temperature removal bottom platform having a length of 30 cm, a height of 5 cm and a width of 20 cm. Two adjacent temperature interference removal sensing optical fiber monitoring devices are connected through a left connecting clamping groove 221 having a length of 30 cm and a width of 4 cm, a right connecting clamping groove 210 having a length of 30 cm and a width of 4 cm and a clamping groove fixing bolt 222 having a height of 6 cm and a diameter of 1 cm.

A TPU type outer hard fiber protection layer 209 and a TPEE type outer elastic fastening ring 212 having a diameter of 5 cm sequentially cover a GJJV type tight buffered sensing optical fiber in the vacuum chamber module from inside to outside. The TPU type outer hard fiber protection layer 209 is mainly used for effectively fixing the GJJV type tight buffered sensing optical fiber in the vacuum chamber module having a length of 10 cm and a diameter of 5 cm. The TPEE type outer elastic fastening ring 212 is mainly used for protecting the outer hard fiber protection layer 209. The TPEE type outer elastic fastening ring 212 and the cover plate 217 form a cavity structure, i.e., a vacuum chamber 216 having a length of 10 cm and a diameter of 5 cm. The vacuum chamber 216 is connected to a vacuuming device outside a mounting tube, the vacuuming device includes a vacuum pump 215 and an air valve 214, the vacuum chamber 216 is connected to the air valve 214 through a pipeline, the vacuum pump 215 is mounted on the air valve, and a vacuum sensor is mounted on the pipeline. The vacuum sensor detects the degree of vacuum in the vacuum chamber 216. When the degree of vacuum in the vacuum chamber 216 meets the requirements, the vacuum pump 215 stops operating, and the air valve is closed.

The material of a cylinder 219 made of a special composite material in the composite material flat slot module is a special performance resin matrix composite material. A circular arc-shaped concavo-concave glue injection groove 220 is provided at the tail end of the cylinder 219 made of a special performance resin matrix composite material. In this example, the special composite material 219 adopting a special performance resin matrix composite material is embedded into the mounting tube, and it is specified that the product of a difference between a thermal expansion coefficient of the special performance resin matrix composite material and a thermal expansion coefficient of the GJJV type tight buffered sensing optical fiber in the special performance resin matrix composite material and a strain value of the corresponding segment of the GJJV type tight buffered sensing optical fiber is equal to a temperature coefficient of the corresponding segment of the GJJV type tight buffered sensing optical fiber.

Both a left arc-shaped pressing body 204 and a right arc-shaped pressing body 205 in the port fiber fixation module are a hard material structure having a radian of π/3. The left arc-shaped pressing body 204 and the right arc-shaped pressing body 205 are each of a structure having a raised middle and two concave ends. Two bosses are a left arc-shaped pressing tip 200 and a right arc-shaped pressing tip 201.

The left arc-shaped pressing tip 200 and the right arc-shaped pressing tip 201 are each a cuboid having a length of 2 cm and a width of 1 cm, and a frame transverse connecting shaft 203 is in a cylindrical structure form having a diameter of 2 cm and a length of 8 cm. An elastic control cap 202 has an inner diameter of 2 cm and an outer diameter of 2.5 cm. The elastic control cap 202 having an inner diameter of 2 cm and an outer diameter of 2.5 cm may control the movement of the left arc-shaped pressing tip 200 and the right arc-shaped pressing tip 201 on the frame transverse connecting shaft 203 having a diameter of 2 cm and a length of 8 cm. Thus, the GJJV type tight buffered sensing optical fiber 206 is fixed in an arc-shaped pressing cavity by the raised structures of the left arc-shaped pressing body 204 and the right arc-shaped pressing body 205.

The sensing optical fiber acoustic emission demodulation device includes a plurality of sensing optical fiber acoustic emission sensing devices and an acoustic emission source. A sensing optical fiber acoustic emission arrangement module includes four sensing optical fiber acoustic emission arrangement devices.

Each sensing optical fiber acoustic emission arrangement device is internally provided with eight GJJV type tight buffered sensing optical fibers. Different degrees of cracks will be generated inside a dam heel of a high concrete dam under the action of a water load. However, it cannot be found from the appearance, so it is necessary to detect possible internal micro-cracks. The acoustic emission source 336 in the acoustic emission module transmits an acoustic emission wave to the GJJV type tight buffered sensing optical fiber in the sensing optical fiber acoustic emission arrangement module. The GJJV type tight buffered sensing optical fiber is connected to the input end of a receiver 334 in the acoustic emission module, sequentially passes through an optical detector 333, a second amplifier 332, a signal processor 331 and a memory 330, and finally is connected to a concrete structure monitoring and evaluation information system 329.

In this embodiment, each sensing optical fiber acoustic emission sensing device includes a mesh module, four fiber carrying modules and a bend connecting module. The mesh module is connected to the fiber carrying module through a bending folding shaft 402 of a circular arc structure. The bend connecting module is disposed at a bend and is used for bending and fixing the mesh module and the fiber carrying module where the GJJV type tight buffered sensing optical fiber is located.

In this embodiment, there are 16 triangular co-cavity meshes 407 having an equilateral triangle section and a side length of 2 cm, which are arranged in four rows and located in a right upper semi-circle of an inner support body. There are three rows of circular co-cavity meshes 403 having a circular section and a diameter of 3 cm, which consist of 12 cavities having an equal circle section and are located in a left upper semi-circle of the inner support body. There are four rows of four-sided co-cavity meshes 404 having an equilateral quadrangle section and a side length of 2.5 cm, which consist of 12 cavities having an equilateral quadrangle section and are located in a left lower semi-circle of the inner support body. Pentagonal co-cavity meshes 408 having an equilateral pentagon section and a side length of 1.5 cm consist of 12 cavities having an equilateral pentagon section in 3 rows, and are located in a right lower semi-circle of the inner support body. The triangular co-cavity meshes 407 having an equilateral triangle section and a side length of 2 cm, the circular co-cavity meshes 403 having a circular section and a diameter of 3 cm, the four-sided co-cavity meshes 404 having an equilateral quadrangle section and a side length of 2.5 cm and the pentagonal co-cavity meshes 408 having an equilateral pentagon section and a side length of 1.5 cm are sequentially connected to a four-sided concave inner support body 409 in a counterclockwise order.

In this embodiment, the triangular co-cavity meshes 407, the circular co-cavity meshes 403, the four-sided co-cavity meshes 404 and the pentagonal co-cavity meshes 408 are located on four carriers of the same size and shape. For 12 circular co-cavity meshes 403, 16 triangular co-cavity meshes 407, 12 four-sided co-cavity meshes 404 and 12 pentagonal co-cavity meshes 408, since mesh section shapes and arrangement forms are mutually different, the circular co-cavity meshes 403, the triangular co-cavity meshes 407, the four-sided co-cavity meshes 404 and the pentagonal co-cavity meshes 408 will generate different time delays and acoustic wave resonant frequencies when sensing acoustic emission waves.

In this embodiment, four identical fiber carrying modules are included, and an included angle between the adjacent modules among them is 90°. Closing plugs 401 having a circular arc section in each module are symmetrically distributed on both sides of a fiber separating wall 435 having a length of 8 cm. The middle position of a double-optical fiber channel 405 having a diameter of 5 cm is the fiber separating wall 435 having a length of 8 cm. The fiber separating wall 435 is a VIP plate. The periphery of the double-optical fiber channel 405 having a diameter of 5 cm is a semi-circular fiber bearing platform 406 having a diameter of 12 cm. Bending folding shafts 402 having a circular arc section are located on both sides of the closing plug 401 having a circular arc section. The closing plug 401 having a circular arc section is located at the upper end of the semi-circular fiber bearing platform 406 having a diameter of 12 cm. By rotating the closing plug 401 around the bending folding shaft 402, the double-optical fiber channel 405 having a diameter of 5 cm can be pressed into the semi-circular fiber bearing platform 406 having a diameter of 12 cm. After the closing plugs 401 having a circular arc section are symmetrically distributed on both sides of the fiber separating wall 435 having a length of 8 cm, an obstructing block 400 having a length of 2 cm and a width of 1 cm is buckled to the outer end of the fiber separating wall 435 having a length of 8 cm, so as to fix the closing part of the closing plug 401. The obstructing block 400 may be of a screw-like structure to lock the two closing plugs.

In this embodiment, a folding shaft epitaxial column 410 having a height of 50 cm and a width of 5 cm is located at a middle position between a first base 412 having a bottom width of 30 cm and a second base 411 having a bottom width of 30 cm. The first base 412 is connected to the folding shaft epitaxial column 410 through a first collar 417, the second base 411 is connected to the folding shaft epitaxial column 410 through a second collar 418, and the first collar 417 and the second collar 418 are separately provided with a locking device. The upper end of the first base 412 is provided with a first fiber carrying bent hole 413 having a diameter of 30 cm, and the first fiber carrying bent hole 413 having a diameter of 30 cm on the first base 412 having a bottom width of 30 cm is used for placement of one end of a component composed of the mesh module and the fiber carrying module. The upper end of the second base 411 having a bottom width of 30 cm is provided with a second fiber carrying bent hole 414 having a diameter of 30 cm, and the second fiber carrying bent hole 414 on the second base 411 is used for placement of the other end of component composed of the mesh module and the fiber carrying module. An outer edge of the bending folding shaft 415 having a diameter of 3 cm and a height of 60 cm is connected to an inner edge of the folding shaft epitaxial column 410 having a height of 50 cm and a width of 5 cm. The bending folding shaft 415 is located at the middle position of the folding shaft epitaxial column 410. The first fiber carrying bent hole 413 having a diameter of 30 cm and the second fiber carrying bent hole 414 having a diameter of 30 cm are connected to the bending folding shaft 415 having a diameter of 3 cm and a height of 60 cm through the folding shaft epitaxial column 410. By rotating the folding shaft epitaxial column 410, a certain angle will be formed between the first fiber carrying bent hole 413 and the second fiber carrying bent hole 414. The first collar 417 and the second collar 418 are locked onto the folding shaft epitaxial column 410 through the locking device. A fixing plug 416 having a diameter of 3.8 cm and a height of 1.5 cm is located at the upper end surface of the bending folding shaft 415 having a diameter of 3 cm and a height of 60 cm. The portion of the bending folding shaft 415 beyond the folding shaft epitaxial column 410 has threads. After the fixing plug 416 having a diameter of 3.8 cm and a height of 1.5 cm is screwed into the upper end of the bending folding shaft 415, the first fiber carrying bent hole 413 having a diameter of 30 cm and the second fiber carrying bent hole 414 having a diameter of 30 cm can be fixed at any angle.

In this embodiment, a laser light source 319 can emit a laser pulse, and the output end of the laser light source 319 is connected to the input end of a mode-locked laser 320. A laser ultrashort pulse can be generated by a mode-locking technology, and the width of the laser pulse is shortened to femtosecond magnitude to generate a high pulse width and power value. The output end of the mode-locked laser 320 is connected to the input end of a polarization beam splitter 321, the output end of the polarization beam splitter 321 is connected to the input end of a nonlinear amplifier 322, and the output end of the nonlinear amplifier 322 is connected to the input end of a spectrometer 323 to use the spectrometer 323 which an apparatus used to measure the intensity of different wavelength positions of a spectral line through an optical detector such as a photomultiplier tube. The output end of the spectrometer 323 is connected to the input end of a Michelson interferometer 324. A femtosecond pulse output by the Michelson interferometer 324 passes through the input end of an edge filter 326 and enters the input end of a first amplifier 327. The output end of the first amplifier 327 is connected to the input end of an optical splitter 328. The output end of the optical splitter 328 is connected to the input ends of sensing optical fibers in four sensing optical fiber acoustic emission arrangement devices 335.

In this embodiment, when a water level is 100 m, different degrees and different lengths of cracks are generated in a dam heel of a high concrete dam under the pressure of 100 m head pressure. In this case, cracks with different lengths will stimulate the generation of an acoustic emission source 336. Optical information of GJJV type tight buffered sensing optical fibers in four sensing optical fiber acoustic emission arrangement devices inside a concrete structure will continuously change with an acoustic emission wave generated by the acoustic emission source 336. An optical signal output end of the sensing optical fiber is connected to the input end of the receiver 334, the output end of the receiver 334 is connected to the input end of the optical detector 333, the output end of the optical detector 333 is connected to the input end of the second amplifier 332, the output end of the second amplifier 332 is connected to the input end of the signal processor 331, and the output end of the signal processor 331 is connected to the input end of the memory 330. The optical information on the sensing optical fiber changing with the change of the acoustic emission wave is stored by the memory 330 in real time, and is continuously output to the concrete structure monitoring and evaluation information system 329.

In this invention, 8 sensing optical fibers in the sensing optical fiber acoustic emission demodulation device all need to pass through a sensing optical fiber temperature sensitivity compensation device, but are not connected to the sensing optical fiber acoustic emission demodulation device at one time. That is, after one fiber is measured, another fiber is connected to the sensing optical fiber acoustic emission demodulation device for demodulation.

An operation method of the sensing optical fiber acoustic emission integrated sensing system for monitoring the safety of a structure as described above includes the following steps:

(1) Determine a Region to be Monitored, and Assemble Each Device and Module

A region to be monitored on the surface of a hydraulic concrete dam is a plane region of 100 m×100 m. It is planned to use 8 sensing optical fibers having a length of 500 m, and based on the previous monitoring conditions and construction status of the structure at the time, a sensing optical fiber temperature interference removal device and a sensing optical fiber acoustic emission demodulation device are sequentially configured.

(2) Package a Sensing Optical Fiber and Perform Initial Arrangement 16 triangular co-cavity meshes 407 having an equilateral triangle section and a side length of 2 cm, 12 circular co-cavity meshes 403 having a circular section and a diameter of 3 cm, 12 four-sided co-cavity meshes 404 having an equilateral quadrangle section and a side length of 2.5 cm and 12 pentagonal co-cavity meshes 408 having an equilateral pentagon section and a side length of 1.5 cm are sequentially connected to a four-sided concave inner support body 409 in a counterclockwise order. 8 GJJV type tight buffered sensing optical fibers having a length of 500 m are arranged in a double-optical fiber channel 405 having a diameter of 5 cm, a bending folding shaft 402 is then rotated to close closing plugs 401 on both sides, an obstructing block 400 passes through the upper end of a fiber separating wall 435, a closed part of the closing plugs 401 on both sides is fixed, and the configured mesh module and four-way fiber carrying module are placed in a bend connecting module for initial arrangement.

(3) Debug Each Module and Acquire an Initial Monitoring Capability

A frame transverse connecting shaft 203 having a diameter of 2 cm and a length of 8 cm is rotated to connect a left arc-shaped pressing tip 200 having a length of 2 cm and a width of 1 cm and a right arc-shaped pressing tip 201 having a length of 2 cm and a width of 1 cm to the frame transverse connecting shaft 203 having a diameter of 2 cm and a length of 8 cm in series, an elastic control cap 202 having an inner diameter of 2 cm and an outer diameter of 2.5 cm on the frame transverse connecting shaft 203 is rotated, the elastic control cap 202 is controlled to rotate inward, and a GJJV type tight buffered sensing optical fiber is fixed into an arc-shaped pressing cavity 207 through the raised middle parts of a left arc-shaped pressing body 204 having a radian of $\pi/3$ and a right arc-shaped pressing body 205 having a radian of $\pi/3$; and when it is determined that 11 angles between first fiber carrying bent holes 413 having a diameter of 30 cm and second fiber carrying bent holes 414 having a diameter of 30 cm are all 60°, the angles between the first fiber carrying bent holes 413 and the second fiber carrying bent holes 414 are fixed.

(4) Run Debugging and Acquire an Initial Value

A vacuum chamber 216 is vacuumed by a vacuum pump 215 to form a closed cavity. In this case, the GJJV type tight buffered sensing optical fiber in this vacuum chamber segment is in a state where there is no external temperature interference, and a value is recorded as a first temperature interference-free sensing optical fiber monitoring strain value; fast gel water is injected into a circular arc-shaped concavo-concave glue injection groove 220, so that the vacuum chamber 216 is in a full vacuum or quasi-vacuum state, and the GJJV type tight buffered sensing optical fiber passing through this position is also fixed; in this case, a strain value generated by an external load and obtained by the GJJV type tight buffered sensing optical fiber of the cylinder is a value obtained after the temperature influence is removed, and it is recorded as a second temperature interference-free sensing optical fiber monitoring strain value; and an average value of the strain values generated by an external load and monitored by the GJJV type tight buffered sensing optical fiber of the vacuum chamber 216 segment and the cylinder segment conforms to a normal distribution law, and a value corresponding to the maximum probability serves as a final monitoring result.

(5) Open Each Component and Perform Real-Time Monitoring and Analysis

If damage occurs in a hydraulic concrete dam, an acoustic emission signal will be generated. The acoustic emission signal propagated through pentagonal co-cavity meshes 408, triangular co-cavity meshes 407, circular co-cavity meshes 403 and four-sided co-cavity meshes 404 are transmitted to the GJJV type tight buffered sensing optical fiber in a sensing optical fiber acoustic emission sensing device according to different time and frequencies. Changed optical information in the GJJV type tight buffered sensing optical fiber is gathered into a structure monitoring and evaluation information system 329 through a receiver 334, an optical detector 333 and a memory 330 to evaluate the degree and position of the structural damage, thereby implementing dynamic monitoring and analysis.

The above descriptions are only preferred implementations of the present invention. It should be noted that a person of ordinary skill in the art can also make several improvements and modifications without departing from the principles of the present invention. These improvements and modifications should be considered as the scope of protection of the present invention.

What is claimed is:

1. A sensing optical fiber acoustic emission integrated sensing system for monitoring safety of a structure, comprising: a sensing optical fiber temperature interference removal device and a sensing optical fiber acoustic emission demodulation device, wherein a sensing optical fiber starts from the sensing optical fiber acoustic emission demodulation device, passes through the sensing optical fiber temperature interference removal device and finally returns back to the sensing optical fiber acoustic emission demodulation device, and head and tail ends of the sensing optical fiber in the sensing optical fiber temperature interference removal device is connected to the sensing optical fiber acoustic emission demodulation device;

the sensing optical fiber temperature interference removal device comprises a vacuum chamber module, a composite material flat slot module and a port fiber fixation module, the vacuum chamber module is connected to the composite material flat slot module, the port fiber fixation module is connected to the vacuum chamber module through a four-corner plug body, the sensing optical fiber sequentially passes through the composite material flat slot module, the vacuum chamber module and the port fiber fixation module, the vacuum chamber module, the composite material flat slot module and the port fiber fixation module are all fixed in a mounting tube, and the mounting tube is located on a temperature removal bottom platform; the composite material flat slot module comprises a cylinder made of a special composite material, a through hole through which the sensing optical fiber passes is provided in the center of the cylinder, a pressing cover is disposed at the top of the cylinder, and a concavo-concave glue injection groove is provided in the center of the pressing cover; the vacuum chamber module comprises a vacuum chamber and an outer elastic fastening ring, one end of the vacuum chamber is connected to a cover plate which is fixed in the mounting tube by glue while other end is connected to the outer elastic fastening ring, a circular hole is provided in center of the outer elastic fastening ring, an outer hard fiber protection layer is disposed in the circular hole, a conical hole is provided at bottom end of the outer elastic fastening ring, the four-corner plug body is mounted in the conical hole, a cylindrical boss extends from the four-corner plug body, the cylindrical boss is located in the outer hard fiber protection layer, the sensing optical fiber passes through the interior of the cylindrical boss, the vacuum chamber is connected to a vacuuming device outside the mounting tube, and the sensing optical fiber sequentially passes through the cover plate, the vacuum chamber and the four-corner plug body; the port fiber fixation module comprises a left arc-shaped pressing body and a right arc-shaped pressing body, one end of the left arc-shaped pressing body and the right arc-shaped pressing body are hinged to the bottom end of the outer elastic fastening ring while bosses extend from the other ends of the left arc-shaped pressing body and the right arc-shaped pressing body respectively, the boss is provided with a connecting device, arc-shaped surfaces of the left arc-shaped pressing body and the right arc-shaped pressing body are disposed face to face, and the left arc-shaped pressing body and the right arc-shaped pressing body form an arc-shaped pressing cavity through which the sensing optical fiber passes; the sensing optical fiber acoustic emission demodulation device comprises a plurality of sensing optical fiber acoustic emission sensing devices and an acoustic emission source, the sensing optical fiber acoustic emission arrangement device comprises an inner support body, a mesh module, a fiber carrying module and a bend connecting module, the inner support body, the mesh module and the fiber carrying module form a cylindrical shape, the inner support body has a four-sided concave section, the inner support body has four concave surfaces, the four concave surfaces of the inner support body are separately provided with a mesh module having a plurality of meshes, a fiber carrying module is disposed between two adjacent mesh modules, and the sensing optical fiber is contained in the fiber carrying module; and the acoustic emission source is connected to one end of the sensing optical fiber, other end of the sensing optical fiber is connected to a receiver, and the receiver is sequentially connected to an optical detector, a second amplifier, a signal processor, a memory, and a concrete structure monitoring and evaluation information system.

2. The sensing optical fiber acoustic emission integrated sensing system for monitoring the safety of the structure according to claim 1, wherein the vacuuming device comprises a vacuum pump and an air valve, the vacuum chamber is connected to the air valve through a pipeline, the vacuum pump is mounted on the air valve, and a vacuum sensor is mounted on the pipeline.

3. The sensing optical fiber acoustic emission integrated sensing system for monitoring the safety of the structure according to claim 1, wherein the connecting device comprises a frame transverse connecting shaft, the two bosses are separately provided with a through hole, and the frame transverse connecting shaft passes through the two through holes and is locked by an elastic control cap.

4. The sensing optical fiber acoustic emission integrated sensing system for monitoring the safety of the structure according to claim 1, further comprising a laser light source, wherein the laser light source is connected to an optical splitter through a mode-locked laser, a polarization beam splitter, a nonlinear amplifier, a spectrometer, a Michelson interferometer, a femtosecond pulse, an edge filter and a first amplifier sequentially, and the optical splitter is connected to the sensing optical fiber.

5. The sensing optical fiber acoustic emission integrated sensing system for monitoring the safety of the structure according to claim 1, wherein the mesh module comprises a carrier, the carrier is provided with meshes in the axis direction of the sensing optical fiber, each carrier is provided with one of a triangular co-cavity mesh, a circular co-cavity mesh, a four-sided co-cavity mesh and a pentagonal co-cavity mesh, the meshes of all the carrier have different shapes, and the triangular co-cavity mesh, the circular co-cavity mesh, the four-sided co-cavity mesh and the pentagonal co-cavity mesh are arranged in a counterclockwise order.

6. The sensing optical fiber acoustic emission integrated sensing system for monitoring the safety of the structure according to claim 1, wherein the fiber carrying module comprises an obstructing block, a closing plug, a double-optical fiber channel and a semi-circular fiber bearing platform, the semi-circular fiber bearing platform is connected to the carrier, the double-optical fiber channel is disposed in the semi-circular fiber bearing platform, two sensing optical fibers are provided in the double-optical fiber channel, both sides of the top of the semi-circular fiber bearing platform are separately hinged to a closing plug, and the two closing plugs are locked by the obstructing block.

7. The sensing optical fiber acoustic emission integrated sensing system for monitoring the safety of the structure according to claim 6, wherein a fiber separating wall for separating two sensing optical fibers is disposed in the semi-circular fiber bearing platform, and the fiber separating wall is a vacuum insulation panel.

8. The sensing optical fiber acoustic emission integrated sensing system for monitoring the safety of the structure according to claim 1, further comprising a bend connecting module, wherein the bend connecting module comprises a first base and a second base, the first base is connected to a folding shaft epitaxial column through a first collar, the second base is connected to the folding shaft epitaxial column through a second collar, the first collar and the second collar are separately provided with a locking device, upper end of the first base is provided with a first fiber carrying bent hole, upper end of the second base is provided with a second fiber carrying bent hole, the folding shaft epitaxial column is provided with an inner through hole, the inner through hole is internally provided with a bending folding shaft, and upper end surface of a bending folding shaft is provided with a fixing plug.

9. An operation method of a distributed sensing optical fiber acoustic emission regulation and control device for sensing degradation of structure performance according to claim 1, comprising the following steps:

first, connecting two bosses in series to a frame transverse connecting shaft through the frame transverse connecting shaft, rotating an elastic control cap on the frame transverse connecting shaft, and controlling the elastic control cap to rotate inward, so that the bosses move toward each other, and a sensing optical fiber is fixed into an arc-shaped pressing cavity by the bosses to form a vibrating wire form;

second, configuring an outer hard fiber protection layer and an outer elastic fastening ring from inside to outside, fixing a cover plate in a mounting tube through glue to form a closed cavity, and fixing a sensing optical fiber on the cover plate by glue injection, wherein a vacuum chamber segment has no external temperature interference, recording a strain value as a first temperature interference-free sensing optical fiber monitoring strain value after the temperature influence is removed; an average value of the strain values generated by an external load and monitored by sensing optical fibers of a vacuum chamber segment and a cylinder serves as a final monitoring result, wherein the vacuum chamber segment has no external temperature interference;

third, removing an obstructing block, opening closing plugs on both sides around a bending folding shaft, arranging a double-optical fiber channel at bottom end of a semi-circular fiber bearing platform along a fiber separating wall, arranging eight sensing optical fibers in four double-optical fiber channels in pairs, closing the closing plugs on both sides around the bending folding shaft, pressing a butt joint between the closing plugs, allowing the obstructing block to pass through the upper end of the fiber separating wall, fixing a closed part of the closing plugs on both sides, fixing obstructing blocks on other fiber separating walls in the same way, and finally completing the arrangement of a mesh module and a four-way fiber carrying module;

fourth, rotating a bending folding shaft to drive a first base and a second base to rotate so as to form a certain included angle between a first fiber carrying bent hole and a second fiber carrying bent hole, inserting a fixing plug into the bending folding shaft, fixing the bending folding shaft, and thus fixing an angle between the first fiber carrying bent hole and the second fiber carrying bent hole; and fifth, generating an acoustic emission source under an external load, causing influence on femtosecond pulse light information of the sensing optical fiber in the sensing optical fiber acoustic emission sensing device by an acoustic emission wave in the acoustic emission source, wherein these pieces of information is amplified and delayed in the physical size, the acoustic emission information that is secondarily amplified and delayed is transmitted to the sensing optical fiber, the changed femtosecond pulsed light information is received and detected by a receiver and an optical detector, the changed femtosecond pulse light information is subjected to denoising processing and data storage through a signal processor and a memory and then gathered into a structure monitoring and evaluation information system, and a time-history curve of the femtosecond pulse light information in the structure monitoring and evaluation information system is drawn to reflect the change of the acoustic emission wave generated by the acoustic emission source, thereby realizing dynamic monitoring of the structure.

* * * * *